United States Patent
Middleton et al.

[11] Patent Number: 6,014,211
[45] Date of Patent: Jan. 11, 2000

[54] DEVICE AND METHOD FOR PROVIDING A LASER LEVEL PLANE

[75] Inventors: Michael A. Middleton, San Jose; Christopher O. Middleton, Campbell, both of Calif.

[73] Assignee: Laser Reference, Campbell, Calif.

[21] Appl. No.: 09/009,796

[22] Filed: Jan. 20, 1998

[51] Int. Cl.[7] .................................................... G01C 9/12
[52] U.S. Cl. .................................................... 356/250
[58] Field of Search .................................... 356/399–401, 356/247–255, 148, 149, 150, 138; 33/DIG. 21, 286, 290, 291, 391, 336.14; 73/304 C; 324/678

[56] References Cited

U.S. PATENT DOCUMENTS

| | | |
|---|---|---|
| 3,059,520 | 10/1962 | Tsubokawa . |
| 3,838,927 | 10/1974 | Iwafune et al. . |
| 3,856,409 | 12/1974 | Cindrich et al. . |
| 4,001,676 | 1/1977 | Hile et al. . |
| 4,111,564 | 9/1978 | Trice, Jr. . |
| 4,183,667 | 1/1980 | Denton . |
| 4,674,870 | 6/1987 | Cain et al. . |
| 4,679,937 | 7/1987 | Cain et al. . |
| 4,713,890 | 12/1987 | Wells et al. . |
| 4,732,471 | 3/1988 | Cain et al. . |
| 4,756,617 | 7/1988 | Cain et al. . |
| 4,767,208 | 8/1988 | Cain et al. . |
| 4,776,672 | 10/1988 | Rando et al. . |
| 4,781,457 | 11/1988 | Hirano et al. . |
| 4,854,704 | 8/1989 | Funazaki et al. . |
| 4,912,851 | 4/1990 | Rando et al. . |
| 4,993,161 | 2/1991 | Borkovitz . |
| 5,033,848 | 7/1991 | Hart et al. . |
| 5,051,921 | 9/1991 | Paglione . |
| 5,108,177 | 4/1992 | Middleton . |
| 5,220,455 | 6/1993 | Wilcken . |
| 5,257,279 | 10/1993 | Dugan et al. . |
| B1 4,221,483 | 8/1991 | Rando . |

*Primary Examiner*—K. P. Hantis
*Attorney, Agent, or Firm*—Hickman Stephens & Coleman LLP

[57] ABSTRACT

Disclosed is a laser level device that includes a reference surface, and a laser beam generator that is coupled to the reference surface. The laser level device also includes a compensator that is supported proximate to the reference surface. The compensator has a pendulum that includes a polygonal body with at least a four point suspension. The compensator also has optics that are coupled to the polygonal body in the path of a laser beam that is produced by the laser beam generator to redirect the laser beam, and a keeper that is coupled to the reference surface and is at least partially surrounding the polygonal body such that an air gap may be provided between the polygonal body and the keeper. The laser level device further includes a beam sweeper that is supported above the reference surface in the path of the redirected laser beam to sweep the redirected laser beam in a plane.

41 Claims, 8 Drawing Sheets

DEVICE AND METHOD FOR PROVIDING A LASER LEVEL PLANE

BACKGROUND OF THE INVENTION

1. Field of the Invention

This invention relates generally to providing laser level planes, and more particularly to laser level plane apparatus incorporating self-leveling devices.

2. Description of the Related Art

In the recent past, laser level devices have been used to determine level horizontal or plumb vertical planes for construction, surveying, remodeling, etc. To determine truly horizontal plane, for example, conventional laser level devices typically direct a vertical light beam from a light source through a collimating lens and into a rotating optics such as a rotating pentaprism. The rotating pentaprism then redirects the vertical light beam approximately 90 degrees to sweep out a level horizontal plane of light. An electronic receiver is typically set up to receive and detect the beam thereby providing a reference level plane.

During the course of usage however, laser level devices can often become tilted or uneven, for example, through bumping. When the devices become tilted or uneven, the vertical light beam tilts as well. Since the rotating pentaprism redirects the light beam by a fixed 90 degrees, tilted or uneven laser level devices generally cannot project a level horizontal plane accurately.

In response, laser level devices can include self-leveling mechanisms to compensate for tilting. An example of one such self-leveling laser level device is found in U.S. Pat. No. 4,221,483, which describes a self-leveling portable laser beam level instrument. The instrument achieves self-leveling by mounting a collimating lens on a suspended compensator pendulum. The optical path of a laser beam from a beam source to a rotating pentaprism is vertical and the light source is concentric with the center of the compensator pendulum. The suspended collimating lens collimates the laser beam from the beam source and at the same time compensates for a tilt to maintain the beam in a truly vertical direction for projecting a truly horizontal plane within a specified range of tilt.

Often however, a need arises for projecting a plumb (i.e., true) vertical plane as well as a level horizontal plane in the field. For example, a plumb vertical plane may be used for erecting vertical structures such as a wall or as a plumb to find the true vertical between two points during construction, surveying, remodeling, and the like.

Unfortunately, the conventional self-leveling laser devices with a collimating lens mounted on compensator pendulum typically cannot project a true vertical plane. This is because the direction of the light beam through the collimating lens in these devices is highly sensitive to the compensating pendulum. Specifically, when a conventional self-leveling laser device with a compensator pendulum is placed on its side, the compensator pendulum, and thus the mounted lens, collapse down onto the same side due to gravity. Hence, the light beam deviates due to the lateral position change, resulting in inaccurate vertical plane. To correct the inaccuracy, expensive kits specifically tailored to be used with these conventional devices have been utilized to generate a plumb vertical plane.

The compensator pendulums of conventional self-leveling devices generally comprise an inner cylinder disposed within a larger outer cylinder. In this configuration, the compensator pendulum may move in lateral directions. Hence, the path of the light beam, which depends on the lens concentrically mounted on the compensator pendulum, is highly sensitive on the position of the pendulum. Accordingly, when the device is laid on a side against a sidewall for vertical plane projection, the its light beam path is deviated, which typically causes inaccurate vertical plane.

Another problem associated with conventional laser level devices is their durability. For example, since portable laser level devices are routinely used in construction environment, they are prone to accidental drops. In particular, conventional laser level devices which utilize wires to suspend compensator pendulums are relatively sensitive to shocks. These wires are typically sensitive to shocks and may break when dropped on the ground.

In view of the foregoing, what is needed is a self-leveling laser level device and method that can project a vertical as well as a level horizontal plane without the expense of a costly kit. Further, what is needed is a self-leveling laser level device and method that is less sensitive on the position of the compensator pendulum in the lateral direction. In addition, what is also needed is a self-leveling laser device and method that provide durability against shocks.

SUMMARY OF THE INVENTION

Broadly speaking, the present invention fills these needs by providing a device and method for projecting a level horizontal or vertical laser plane. It should be appreciated that the present invention can be implemented in numerous ways, including as a process, an apparatus, a system, a device, or a method. Several inventive embodiments of the present invention are described below.

In one embodiment, a laser level device is disclosed. The laser level device includes a reference surface, and a laser beam generator that is coupled to the reference surface. The laser level device further includes a compensator that is supported proximate to the reference surface. The compensator has a pendulum that includes a polygonal body with at least a four point suspension. The compensator also has optics that are coupled to the polygonal body in the path of a laser beam that is produced by the laser beam generator to redirect the laser beam, and a keeper that is coupled to the reference surface and is at least partially surrounding the polygonal body such that an air gap may be provided between the polygonal body and the keeper. The laser level device further includes a beam sweeper that is supported above or below the reference surface in the path of the redirected laser beam to sweep the redirected laser beam in a plane.

In another embodiment, a method for providing a laser level plane is disclosed. The method includes: (a) generating a laser beam; (b) redirecting the laser beam with a compensator that includes a pendulum having a polygonal body with at least a four point suspension; and (c) rotating an optical device in the path of the laser beam redirected by the compensator to provide a laser beam plane. Preferably, the body is essentially a right rectangular prism.

In yet another embodiment, a laser level device having a means for redirecting a laser beam is disclosed. The laser level device includes: (a) a laser beam generator; (b) means for redirecting the laser beam with a compensator including a pendulum having a polygonal body with at least a four point suspension; and (c) a beam sweeper disposed in the path of the laser beam redirected by the compensator to provide a laser beam plane.

Advantageously, the a self-leveling compensator in accordance with the present invention is well suited to provide a true vertical as well as a true horizontal plane by providing a polygonal body having at least four point suspension. Accordingly, expensive supplementary kits are not required to generate a plumb vertical plane. Further, separating the beam generator from the compensator combined with the polygonal body allows a projected vertical plane to be less sensitive on the position of the compensator pendulum in the lateral direction. These and other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a device and method for providing a level horizontal or vertical laser plane. It will be obvious, however, to one skilled in the art, that the present invention may be practiced without some or all of these specific details. In other instances, well known process operations have not been described in detail in order not to unnecessarily obscure the present invention.

The present invention provides a device and method for projecting a level horizontal or vertical plane of laser light. In particular, the device and the method of the present invention automatically compensates for a certain degree of tilt to provide a rotating laser beam that sweeps a true horizontal plane. The specified angle for which tilt compensation is operative is 10 arc minutes in a preferred embodiment of the present invention.

Figure 1A:
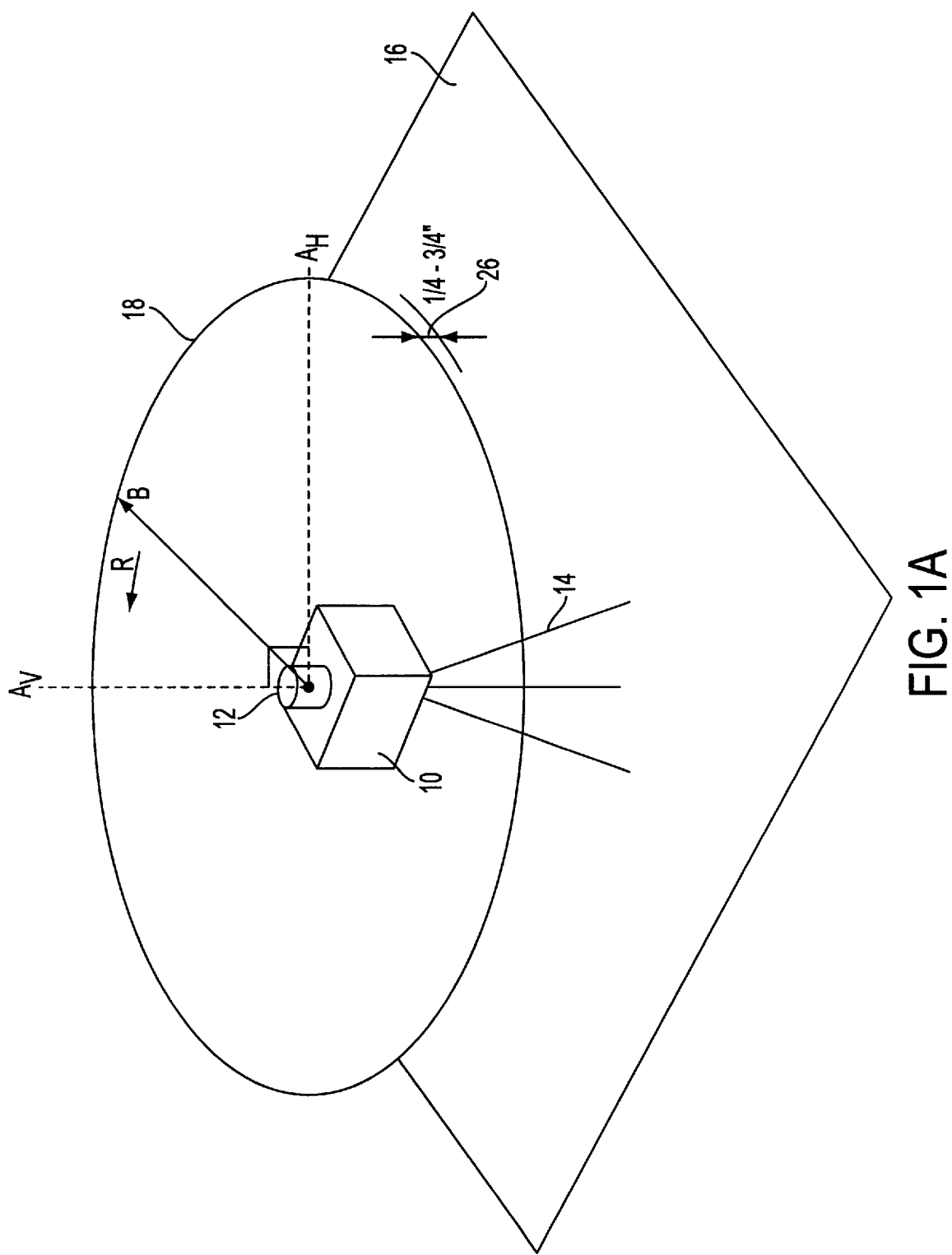
FIG. 1A illustrates a laser level device sweeping out a true horizontal plane in accordance with the present invention.

FIG. 1A illustrates a laser level device 10 sweeping out a true horizontal plane 18 in accordance with one embodiment of the present invention. By "true" it is meant herein that the beam has been compensated for any tilt of the laser level device 10 within its tolerant level (e.g., the 10 minutes of arc). Laser level device 10 is mounted on a support or base 14 (e.g., tripod) for supporting laser level device 10. Support or base 14 is disposed over a surface 16 (e.g., ground, floor, etc.). Laser level device 10 includes a beam sweeper 12 for redirecting a true vertical laser beam to sweep out true horizontal laser plane 18. The alignment of the true vertical laser beam is along a true vertical axis $A_v$, which is also perpendicular or "normal" to the plane 18. Beam sweeper 12 redirects the true vertical laser beam by 90 degrees into true horizontal laser beam B aligned along a true horizontal axis $A_H$. At the same time, beam sweeper 12 sweeps true horizontal laser beam B in true horizontal plane 18 by rotating the beam as indicated at R.

Figure 1B:
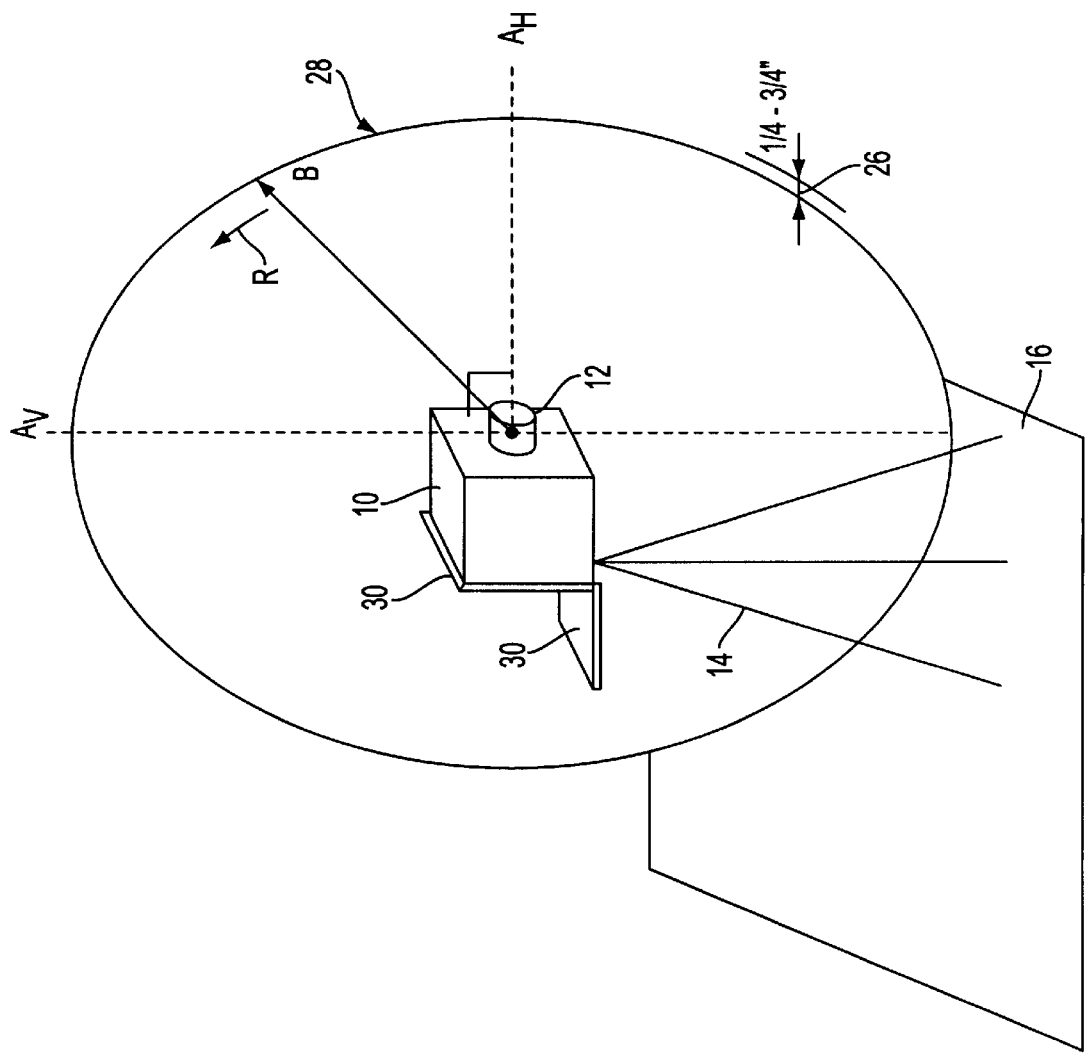
FIG. 1B illustrates a laser level device sweeping out a true vertical plane in accordance with the present invention.

FIG. 1B illustrates a laser level device 10 sweeping out a vertical plane 28 in accordance with one embodiment of the present invention. Laser level device 10 is securely attached to a right angle or ninety-degree plate 30. In turn, ninety-degree plate 30 is mounted on a support or base 14 (e.g., tripod) to support laser level device 10. Support or base 14 is disposed over a surface 16 (e.g., ground, floor, etc.). Laser level device 10 includes the beam sweeper 12 for internally redirecting a horizontal laser beam to sweep vertical plane 28. The alignment of the horizontal laser beam (with the device 10) is along the horizontal axis $A_H$. Beam sweeper 12 redirects the horizontal laser beam by 90 degrees into a laser beam B aligned along the vertical axis $A_v$. The beam sweeper 12 sweeps laser beam B in a vertical plane 28, that includes vertical axis $A_v$. The axis $A_H$ is perpendicular or "normal" to the plane 28.

With reference to FIGS. 1A and 1B, the projected laser beam B is preferably characterized by a thickness 26 of between about ¼ inch to ¾ inch within a range of 10 to 100 feet, depending upon the width of the original beam, its divergence, and the distance at which it is measured. However, those skilled in the art will recognize that the present invention can also be implemented with laser beam of other thicknesses. In addition, it should be appreciated that although laser level device 10 is mounted on support or base 14, laser level device 10 can also be used directly on surface 16 without support or base 14.

Figure 2:
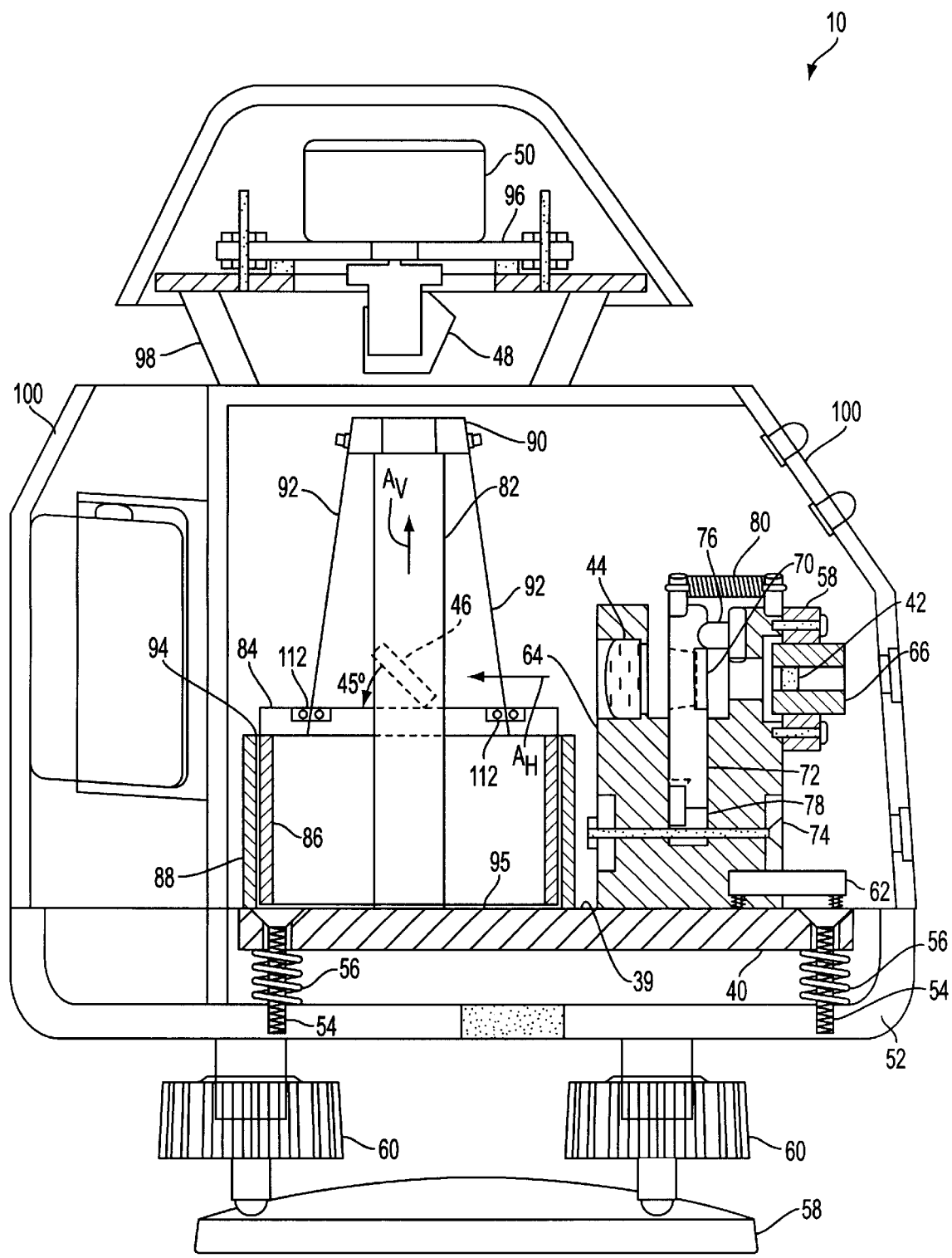
FIG. 2 illustrates a side cross sectional view of a laser level device in accordance with an embodiment of the present invention.

FIG. 2 illustrates a side cross sectional view of laser level device 10 in accordance with the present invention. The laser level device 10 includes a reference surface 39 of a reference plate 40, a laser beam generator including a laser diode 42 and a lens 44, a compensator including a pendulum and a mirror 46, and a beam sweeper 12 including a pentaprism or a penta-mirror assembly 48 and a motor 50. A housing 100 is coupled to reference plate 40 and functions as a protective shell for laser level device 10. In particular, housing 100 shields the sensitive parts of the device such as reference plate 40, the laser beam generator, the compensator, and beam sweeper 12 from the elements of nature such as water, dust, dirt, and the like.

In this configuration, the laser beam generator is coupled to the reference surface and generates a laser beam in a direction $A_H$ that is substantially parallel to the reference surface. Mirror 46 is mounted on the pendulum at a 45 degree angle and redirects the laser beam in a substantially perpendicular direction while the pendulum self-levels or compensates for a certain degree of tilt in laser level device 10 or reference plate 40. Pentaprism 48 receives the compensated laser beam and redirects the beam in a perpendicular direction $A_v$. Motor 50 is coupled to rotate pentaprism or penta-mirror assembly 48 so that the redirected beam sweeps out a level horizontal plane.

With reference to FIG. 2, reference plate 40 provides a reference surface 39 for laser level device 10 in generating a laser beam substantially parallel to the reference surface. Reference plate 40 is mounted on a base 52 with a number of screws 54. A number of springs 56 are disposed around the screws 54 between reference plate 40 and base 52 to absorb shocks to protect sensitive parts of laser level device 10. Preferably, each of plurality of screws 54 is disposed within one of plurality of springs 56 with one screw per spring. A circular level vial or a bubble level 62 is spring mounted on reference plate 40 for guiding the user when adjusting laser level device 10 to be within its self-leveling range. In addition, a vertical level can also be mounted on reference plate 40 for providing a vertical reference for the user in setting up device 10 to generate a vertical laser plane.

Attached to base 52 is a mounting plate 58, which facilitates secure attachment of laser level device 10 to a tripod or other stable mounting devices. In the preferred embodiment, base 52 is attached to mounting plate 58 with a plurality of adjustable leveling screws 60. For initial set up of laser level device 10, each of leveling screws 60 can be adjusted independently until bubble level 62 indicates that reference surface 39 is approximately level within the self-leveling degrees of device 10. In one embodiment, as mentioned previously, laser level device 10 of the present invention provides self-leveling capability to 10 arc minutes. Once level device 10 has been set up in this manner, it self-levels continuously to allow the plane of light to remain level so long as the tilt is within a certain degree of angle (e.g., 10 arc minutes).

Also securely attached to reference plate 40 is a beam generator mount 64, which forms a part of the laser beam generator. Laser diode 42 in the laser beam generator is mounted in a diode mount 66, which is slidably disposed in a diode mount block 68. Thus, diode mount 66 can be adjusted in or out of diode mount block 68 to obtain proper beam collimation during an initial setup. Thereafter, the diode mount 66 can be held in the fixed initial position. Diode mount block 68 is attached to beam generator mount 64 and can be laterally adjusted to produce a beam that is approximately parallel to reference plate 40 for the initial setup. In the preferred embodiment of the present invention, laser diode 42 generates infra-red light. However, it should be appreciated that the present invention can also utilize visible light sources to sweep out a level plane. As used herein, the term "laser beam" means any type of light beam including visible light beam, infrared light beam, etc. and as such are used interchangeably.

With reference to FIG. 2, the light from laser diode 42 is directed toward lens 44 through a beam pointing window 70 mounted on a tilt arm 72. Lens 44 is securely mounted on beam generator mount 64 and is arranged to collimate the light from laser diode 42 into a collimated beam by adjusting the distance between laser diode 42 and lens 44. The collimation allows the beam to remain at relatively small thickness over long distances so that precision elevation checks can be performed. In an alternative embodiment, lens 44 may comprise a system of lenses or an equivalent optical device that is capable of collimating light.

Tilt arm 72 is mounted on beam generator mount 64 between laser diode 42 and lens 44. The angle of tilt arm 72 is adjustable in two axes by turning a pair of calibration screws 74. Tilt arm 72 has a fixed pivot point 76 and is designed to follow the movement of a pair of calibration screw followers 78 by means of a load spring 80. Accordingly, beam pointing window 70 can be used to adjust or steer the light beam in order to calibrate laser plane to level.

With reference still to FIG. 2, the compensator of the present invention comprises a pair of support structures 82, a pendulum comprising a top plate 84 and an inner cylinder 86, and an outer cylinder 88. Support structures 82 are each securely attached to reference plate 40 at the bottom and to a cross bar 90 across the top. Cross bar 90 is disposed above the pendulum and has an aperture to allow light beam to pass through. Between support structures 82, outer cylinder 88 is securely mounted on reference plate 40. Four suspension wires 92 (e.g., filament, piano wire, multi-strand wire, etc.) are attached to cross bar 90 across the top and to top plate 84 at the bottom by way of clamping plate 112 thereby providing a four point suspension for top plate 84: two wires 92 on each side of cross bar 90. Top plate 84 is attached to the top of inner cylinder 86. The diameter of suspension wires 92 varies in accordance with the weight of the body of the pendulum. In a preferred embodiment, the diameter of suspension wires 92 is approximately 5/1,000 inch and can be implemented using, for example, readily available piano wire.

The sizes of inner cylinder 86 and outer cylinder 88 are configured to allow an air gap 94 between inner cylinder 86 and outer cylinder 88, and a spacing 95 between inner cylinder 86 and reference plate 40. Preferably, the size of air gap 94 is approximately 0.012 inch and a spacing 95 of approximately 0.007 inch between the bottom of inner cylinder 86 and reference plate 40. Air gap 94 and the spacing thus allow inner cylinder 86 to move within the limit defined by outer cylinder 88 and reference plate 40.

Both inner cylinder 86 and outer cylinder 88 are preferably hollow and made of light metal material, e.g., aluminum. In addition, both cylinders 86 and 88 are polygonal in shape to provide for rotational damping as well as lateral damping for the movement of inner cylinder 86. Preferably, the shape for both inner cylinder 86 and outer cylinder 88 are rectangular or square in cross-sectional shape, i.e., the form right rectangular prisms. Thus suspended inner cylinder 86 hangs within a keeper such as larger outer cylinder 88.

In this arrangement, mirror 46 is securely mounted on top plate 84 in the path of the laser beam produced by the laser beam generator. Mirror 46 receives the collimated laser beam which is substantially parallel to reference plate 40. Mirror 46 is mounted so as to direct the laser beam upward through the aperture in cross bar 90 in a true vertical direction. Preferably, mirror 46 is mounted at a 45 degree angle on top plate 84. When laser level device 10 or reference plate 40 is tilted, the suspended pendulum including inner cylinder 86, top plate 84, and mirror 46 continues to compensate for the tilt and directs the laser beam in a true vertical direction. Even though the present invention uses a mirror, the present invention can also utilize a prism such as a right angle prism to redirect the laser beam in a true vertical direction.

Supported above the compensator in the path of the redirected laser beam is beam sweeper 12, which receives the compensated laser beam from the compensator and redirects the laser beam to sweep the laser beam in a level plane through an output window assembly 98. Beam sweeper includes motor 50 mounted on a plate 96, and pentaprism or penta-mirror assembly 48 coupled to motor 50 and mounted on the plate for rotation. Plate 96 is adjustable to configure pentaprism or penta-mirror assembly 48 to be positioned substantially concentric with the beam from the compensator and perpendicular to the beam. Pentaprism or penta-mirror assembly allows the plane of generated laser light to remain in a true level direction even as the device 10 or reference plane 40 is tilted.

Since laser level device 10 of the present invention utilizes mirror 46 or an equivalent device that is mounted on the pendulum to redirect a laser beam, the manner of compensation differs depending on the direction of the movement of the pendulum. In particular, when mirror 46 moves laterally from side to side in the direction perpendicular to $A_H$, the relationship between the change in direction of the laser beam before and after reflection is one-to-one. That is, a lateral mirror movement of five degree causes, for example, change of five degree in the reflected laser beam.

In contrast, when mirror 46 moves from front-to-back along the line defined by the front and back side of mirror 46 (i.e., direction parallel to $A_H$), the change in direction of the laser beam reflecting off of mirror will be double the incident laser beam. For instance, a five degree forward movement of mirror 46 will result in a change of ten degrees in the reflected laser beam. The present invention compensates for the movement of mirror 46 or equivalent optical device by suspending the top plate 84 in such a manner as to allow full correction for the movement of mirror 46 in the direction along its side (i.e., x-axis), but compensate for half of the movement mirror 46 in the front-to-back direction (i.e., y-axis).

Figure 3B:
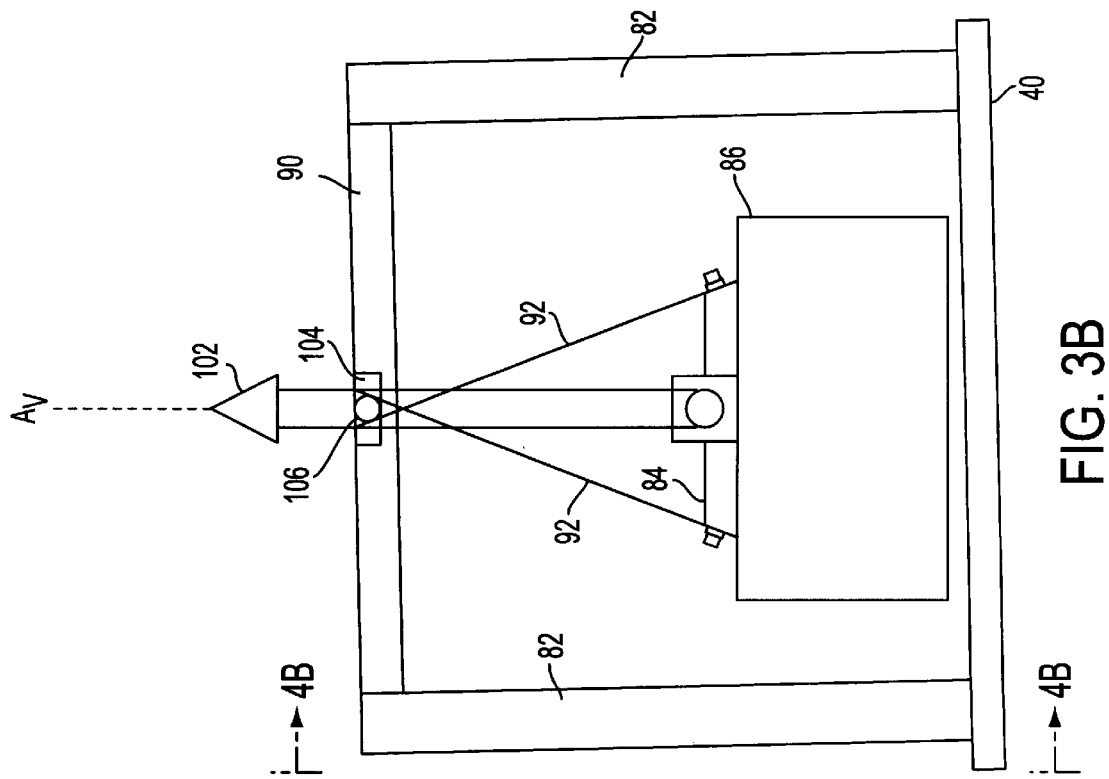
FIG. 3B illustrates a side view of the compensator of FIG. 2 when the reference plate is tilted.
Figure 3A:
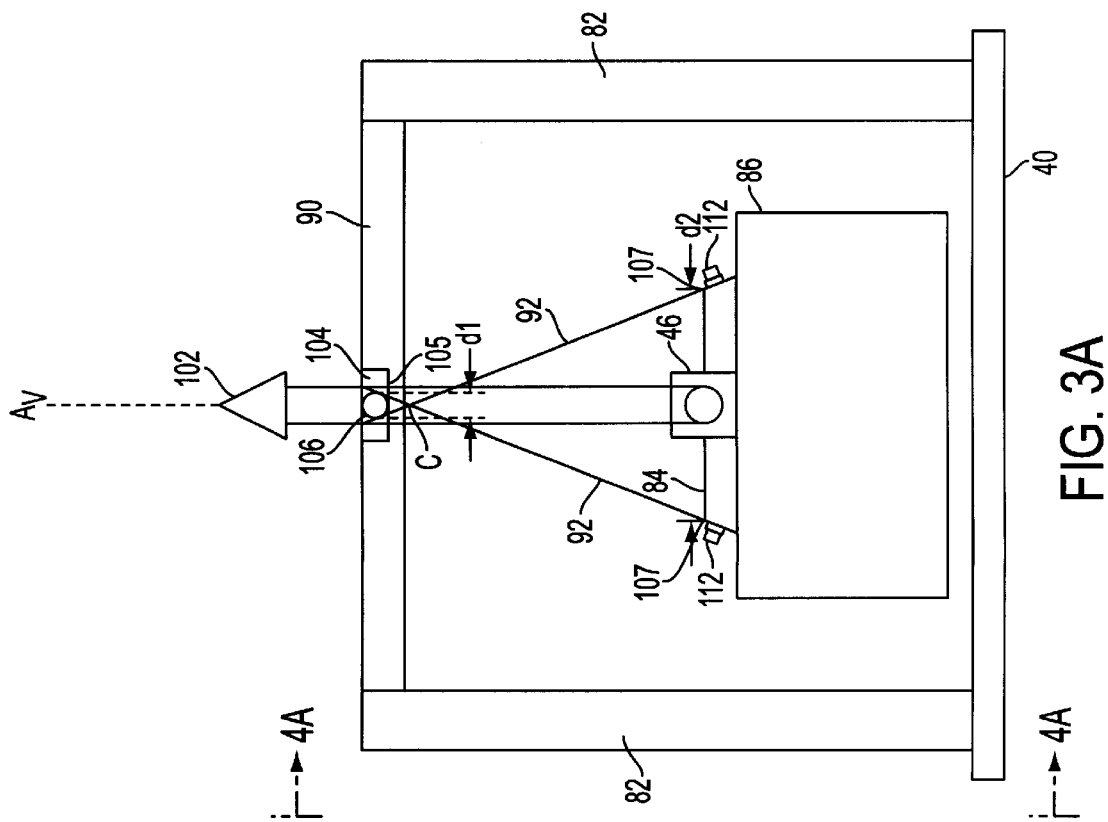
FIG. 3A illustrates a side view of the compensator of FIG. 2 mounted on level reference plate without a tilt depicting how wires are mounted.

FIG. 3A illustrates a side view of the compensator mounted on level reference plate 40 without a tilt depicting how wires 92 are mounted in accordance with one embodiment of the present invention. In this configuration, a pair of wires 92 are crossed in the direction along the sides of mirror 46 (i.e., x-axis) near the top. A top clamping plate 104 fixes the pair of wires 92 onto cross bar 90 at one end of each wires 92. The pair of wires 92 are crossed and the other end of each wires 92 is attached to bottom clamping plates 112. It should be appreciated that the compensator has similar wire and attachment arrangement on the other side of laser level device 10.

The cross-over wires compensate for the wire stiffness, which typically affects the angle of the resulting beam. In FIG. 3A, a pin or spreader 106 fixes the pair of crossed wires 92 onto top clamping plate 104. Pin or spreader 106 fixes the point of crossing of or the distance between the two crossed suspension wires for each of the two pairs of two crossed suspension wires. Distance d1 108 refers to the distance between the pair of wires at the bottom edge 105 of top clamping plate 104.

The distance between the pair of wires 92 at the top edges 107 of bottom clamping plates 112 corresponds to d2. The "cross-over" point C is defined by the ratio of d1 to d2. If d1 increases with respect to d2, then the cross-over point C moves downwardly, which in turn provides greater compensation for stiffness in wires. In accordance with the present invention, the cross-over can be adjusted to compensate for the wire stiffness. The proper cross-over point is preferably determined experimentally. In FIG. 3A, mirror 46 mounted on the cross-over wire compensated pendulum directs an incident light beam 102 in a vertical direction along the true vertical axis $A_v$ 22.

FIG. 3B illustrates a side view of the compensator when reference plate 40 is tilted. When reference plate 40 is tilted, the suspended pendulum (i.e., inner cylinder 86, top plate 84, and suspension wires 92) remains vertical to compensate for the tilt. Mirror 46 mounted on the pendulum redirects light beam 102 along true vertical axis 22.

Figure 4B:
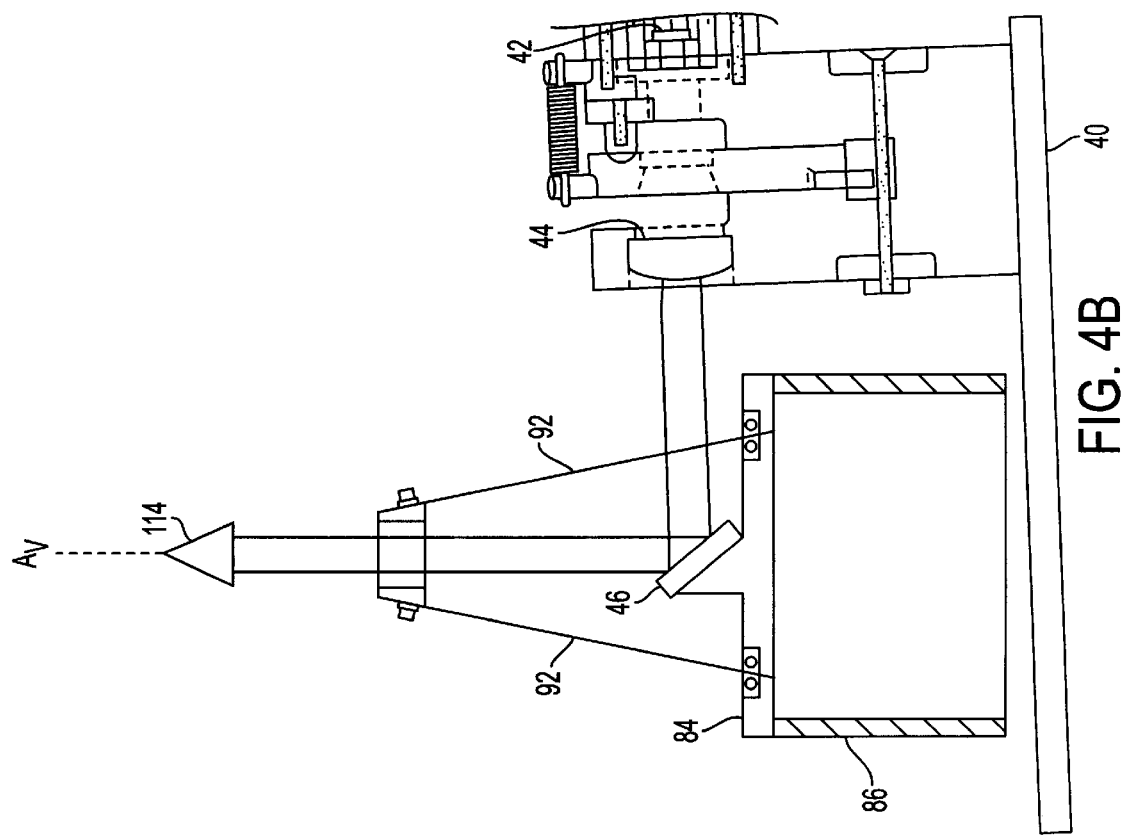
FIG. 4B illustrates a side view taken along line 4B—4B of FIG. 3B of a tilted laser level device showing a laser beam along the true vertical axis Av.
Figure 4A:
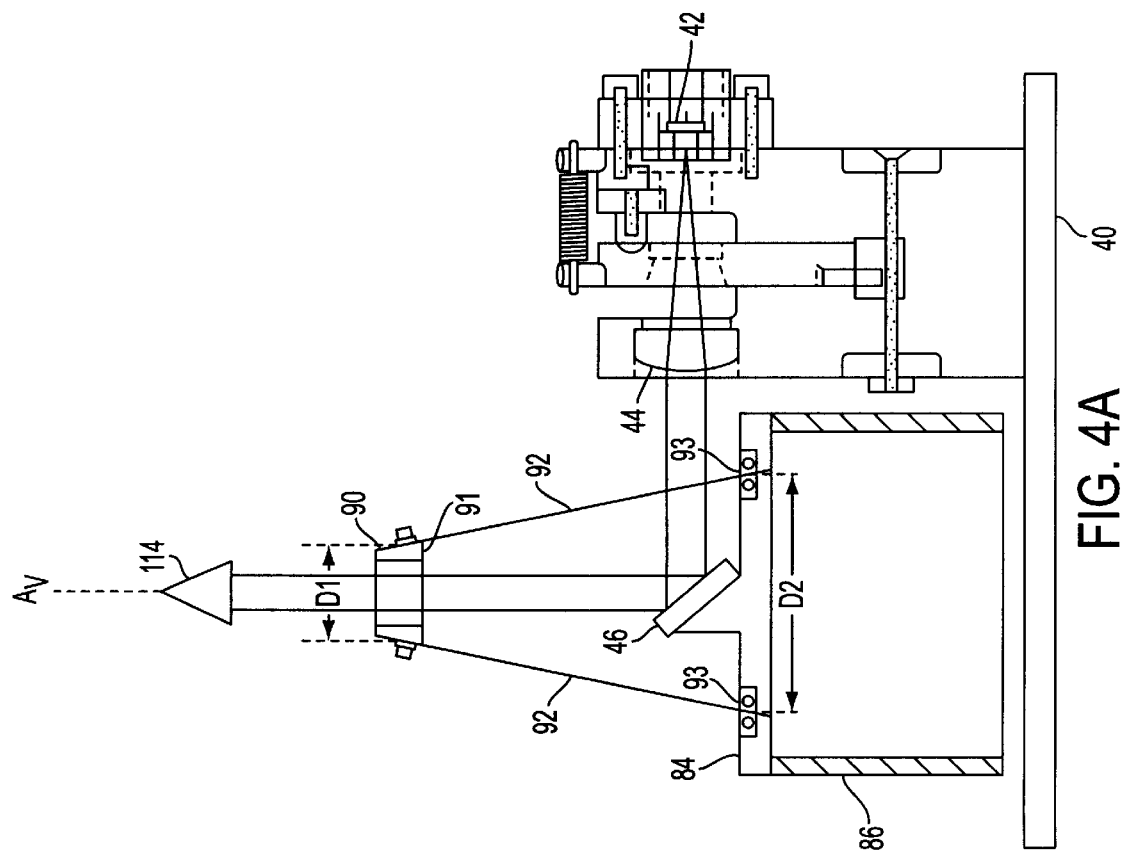
FIG. 4A illustrates a side view taken along line 4A—4A of FIG. 3A of an untilted laser level device depicting the relationship between two pairs of wires.

FIG. 4A illustrates a side view of untilted laser level device 10 as seen along line 4A—4A of FIG. 3A depicting the relationship between two pairs of wires 92 from another view. Although FIG. 4A shows only one wire from each pair of wires 92 along the front-to-back direction of mirror 46 (i.e., y-axis), it should be appreciated that similar wire arrangement is provided on the opposite side. In this configuration, two wires 92 are mounted on cross bar 90 at the top at a distance of D1 between them at the bottom surface 91 of cross bar 90. At the bottom, two wires 92 are mounted on top plate 84 at a distance of D2 between them at the top surface 93 of top plate 84. The distance D2 is twice the distance of D1. This two-to-one ratio between D2 122 and D1 120 ensures that top plate 84, upon which mirror 46 is mounted, tilts with one half the angle of the tilt of reference plate 40. This wire arrangement thus redirects the incident beam along true vertical axis $A_v$ throughout the compensation range since the laser beam 114 reflecting off mirror 46 deviates twice as much as the angle of the tilt of mirror 46. As mentioned previously, the stiffness of wires 92 can be corrected for by slightly varying the spacing of the wire mounting at cross bar 90 and top plate 112.

FIG. 4B is taken along line 4B—4B of FIG. 3B and illustrates a side view of tilted laser level device 10. Even though FIG. 4B shows only one wire from each pair of wires 92 along the front-to-back direction of mirror 46 (i.e., y-axis), it should be appreciated that similar wire arrangement is provided on the opposite side. In FIG. 4B, reference plate 40 is tilted within the compensable range. Laser diode 42 generates light. Lens 44 collimates the light from laser diode 42 to produce a collimated laser beam 114. The suspended body of the pendulum comprising inner cylinder 86 and top plate 84 compensates for the tilt in reference plate 40. Mirror 46 is mounted at 45 degree angle on the top plate 84, which has been compensated for the tilt and redirects incident laser beam 114 in a vertical direction along true vertical axis, Av.

Figure 5B:
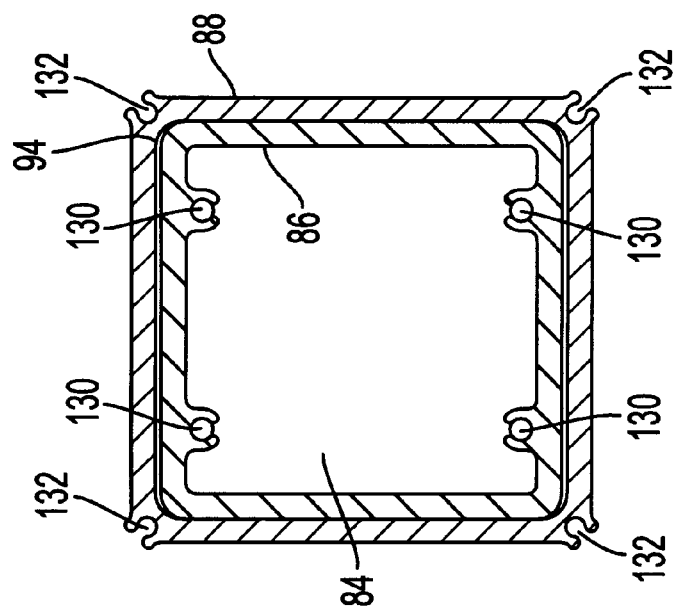
FIG. 5B illustrates a cross sectional view taken along line 5B—5B of FIG. 5A of the polygonal pendulum body disposed in the outer cylinder.
Figure 5A:
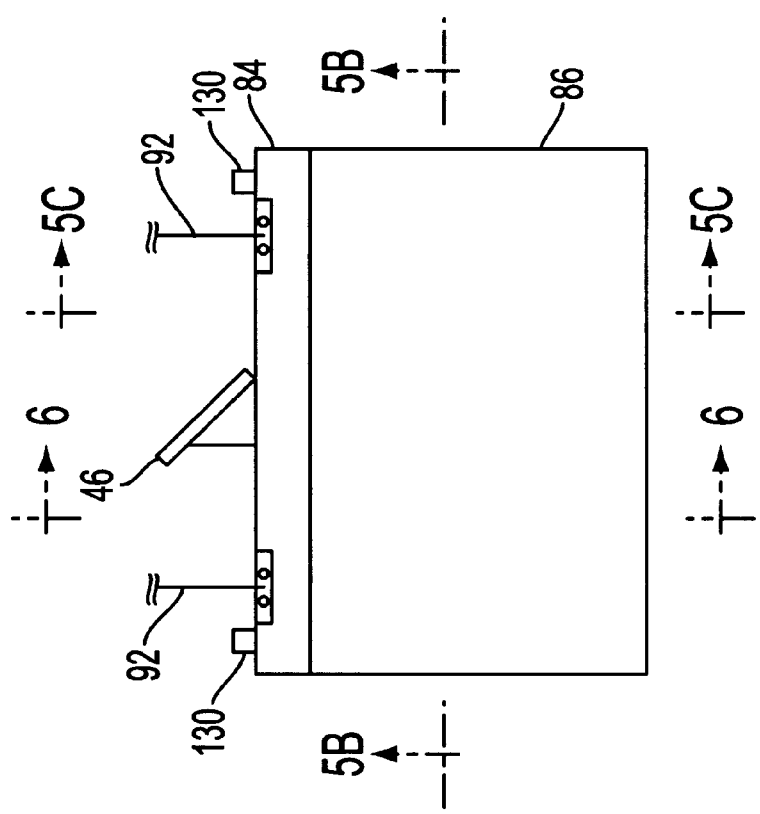
FIG. 5A illustrates a side view of a polygonal pendulum body suspended on wires in accordance with an embodiment of the present invention.

FIG. 5A illustrates a side view of a polygonal pendulum body suspended on wires 92 in accordance with one embodiment of the present invention. The pendulum body comprises inner cylinder 86 in a right rectangular prismatic shape, a rectangular top plate 84 securely attached at the top of inner cylinder 86, and mirror 46 mounted on top plate 84. Inner cylinder 86 is hollow and is preferably made of light metal such as aluminum.

FIG. 5B is a cross sectional view of the polygonal pendulum body disposed in outer cylinder 88 and taken along the line 5B—5B in FIG. 5A. Inner cylinder 86 is disposed within outer cylinder 88. Between inner cylinder 86 and outer cylinder 88 is air gap 94 which allows inner cylinder 86 to move freely to compensate for tilting of laser level device 10. Top plate 84 is securely mounted on inner cylinder 86 through a plurality of screws 130. Outer cylinder 88 is securely attached to reference plate 40 through a plurality of screws 132.

Figure 5C:
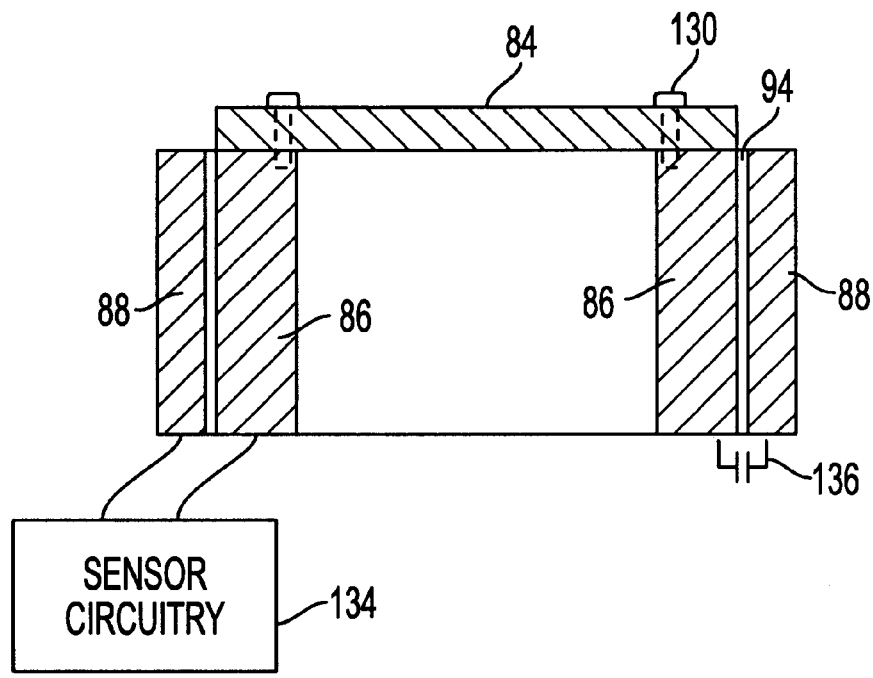
FIG. 5C is a cross sectional view taken along line 5C—5C of FIG. 5A of the polygonal pendulum body disposed in the outer cylinder, with the addition of a sensor circuitry.

FIG. 5C is a side cross sectional view taken along line 5C—5C of FIG. 5A of the polygonal pendulum body disposed in outer cylinder 88 coupled to a sensor circuitry 134. The sensor circuitry 134 is coupled to inner cylinder 86 and outer cylinder 88 to detect the proximity of the cylinders 84 and 86 to each other. When the compensating range is exceeded, for example beyond 10 minute arc, sensor circuitry shuts off laser diode 42 and motor 50 in laser level device 10, unless the level is being used to generate a vertical plane. For this purpose, sensor circuitry 134 measures a capacitance 136 between inner cylinder 86 and outer cylinder 88, as will be discussed in greater detail below with reference to FIG. 7.

Sensor circuitry 134 may also include a switch for disabling the shut-off mode of sensor circuitry for use in projecting a vertical plane. For example, a conventional mercury switch can be used to disable the sensor circuitry. In this case, the mercury switch can be arranged to activate when reference plate is approximately vertical.

Figure 6:
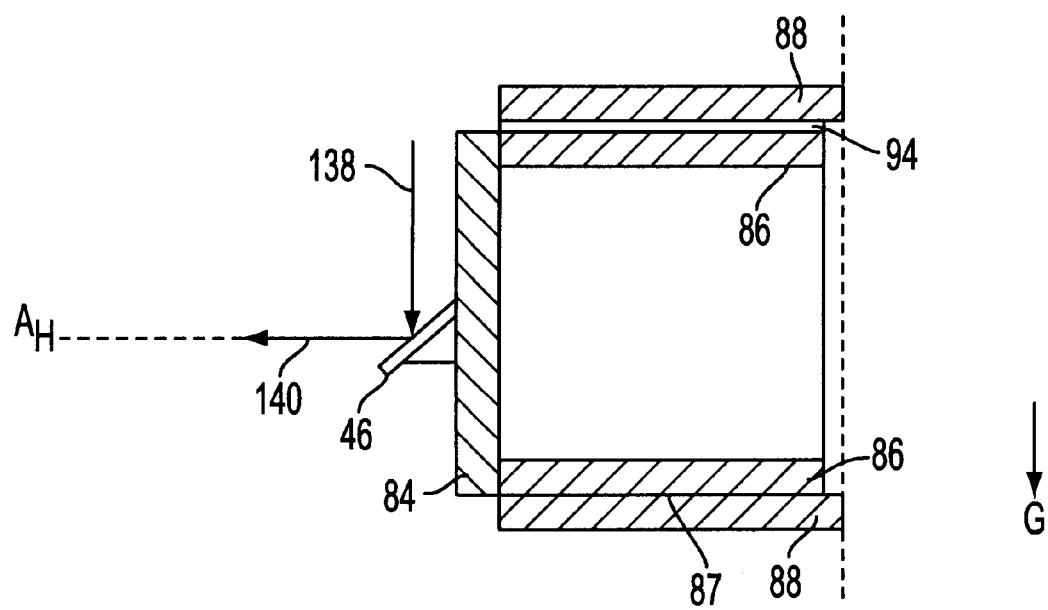
FIG. 6 illustrates a cross sectional view taken along line 6—6 of FIG. 5A and rotated 90 degrees to illustrate the use of the laser level device when it is generating a vertical or plumb laser plane.

FIG. 6 is a cross-sectional view taken along line 6—6 of FIG. 5A and rotated 90 degrees counter clockwise. It is used to reflect a horizontal laser beam 140 for use in sweeping out a vertical laser plane with beam sweeper 12. To sweep out a vertical laser plane, laser level device 10 is laid or mounted on a tripod on its side. In this configuration, inner cylinder 86 rests in flat position on one side of outer cylinder 88; therefore, there is no compensation for device 10 in this position and a bubble level 62 or a vertical level can be used to provide a vertical reference surface 39. However, a switch such as a mercury switch disables sensor circuitry so that laser level device 10 is still operational in this position. A user may set up the system using adjustable screws.

In a typical conventional laser level device having a lens concentric with a pendulum, the pendulum is typically sensitive to lateral movements. Moreover, the pendulum does not lie securely in a flat surface. This is due, in part, to the use of round pendulum bodies and keepers in the prior art. Thus, the lens does not project a truly leveled or plumb laser beam, which were typically compensated by using a costly supplemental kit.

In contrast, the present invention allows generation of more accurately leveled laser beam. In particular, because inner cylinder 86 rests in flat position due to gravity G, the pendulum of the present invention is not sensitive to lateral movements or position of its pendulum. This is possible due to the polygonal shape of inner cylinder 86 and outer cylinder 88. In this configuration, the pendulum is only angle sensitive. That is, the pendulum is sensitive to tilting of the pendulum and not lateral movements. The surface 87 of inner cylinder 86 is essentially parallel to the axis $A_H$ and is essentially perpendicular to the vertical reference surface 39. Thus, mirror 46 mounted on the position insensitive pendulum can redirect an incident laser beam 138 into a truly leveled direction.

Figure 7:
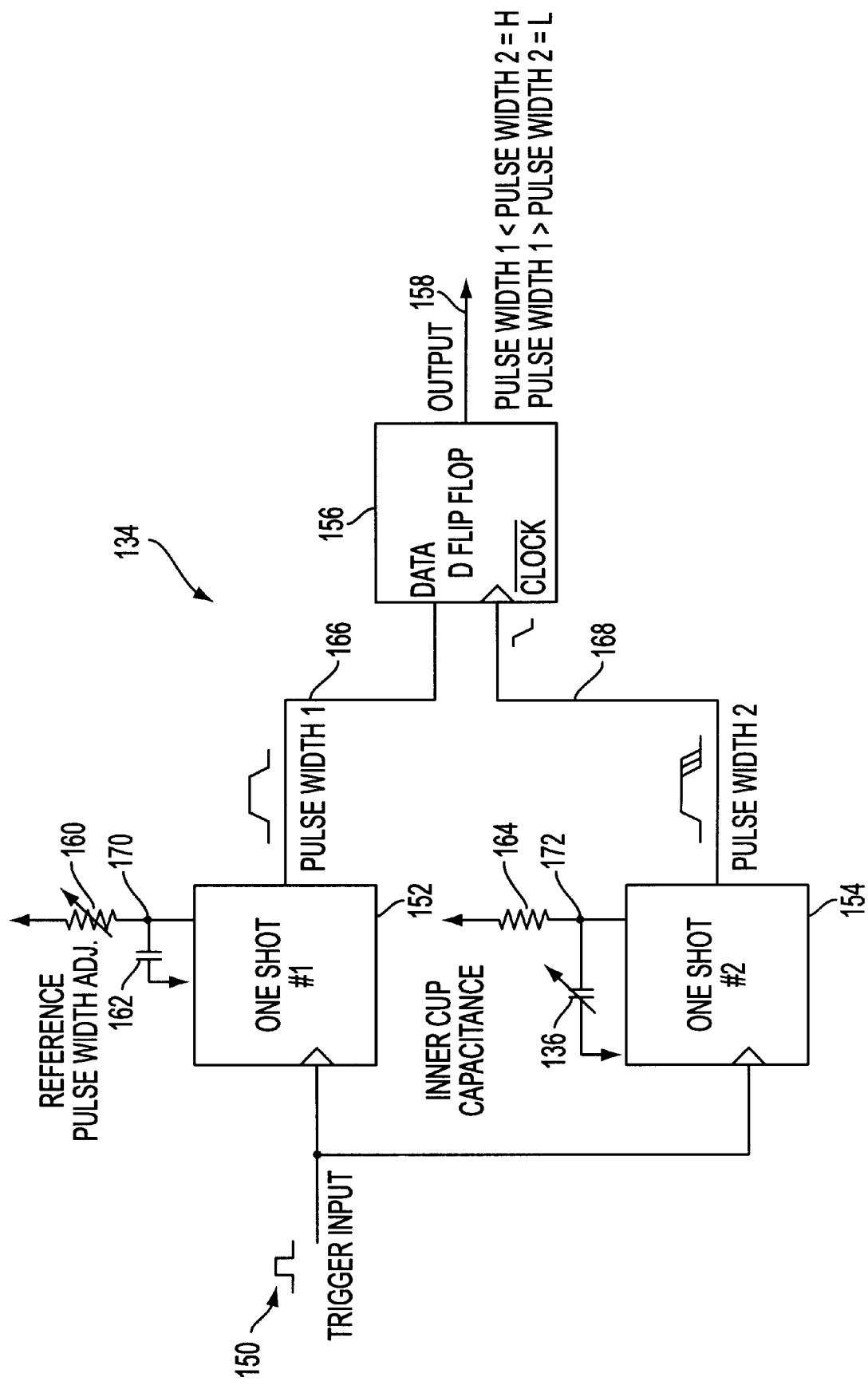
FIG. 7 illustrates a block diagram of the sensor circuitry of FIG. 5C to detect the mutual proximity of the cylinders.

FIG. 7 illustrates a block diagram of sensor circuitry 134 to detect the proximity of the cylinders 84 and 86 to each other in accordance with the present invention. Sensor circuit 134 is adapted to convert the proximity between movable inner cylinder 86 and fixed outer cylinder 88 to a digital pulse width. Using the digital pulse, sensor circuit 134 shuts off power to laser level device 10 when inner cylinder moves more than the predetermined compensation range or closer than the desired minimum distance from outer cylinder 88. For example, when the compensating range is exceeded beyond the 10 minute arc, sensor circuitry shuts off laser diode 42 and motor 50 in laser level device 10.

With reference to FIG. 7, a trigger input pulse 150 is provided as an input to a reference pulse generator 152. Reference pulse generator 152 is coupled in series to a variable resistor 160 and a capacitor 162, and generates a reference pulse having a specified width over line 166 in response to trigger input pulse 150. The reference pulse width is the reference point which indicates the compensation range or distance between inner and outer cylinders 86 and 84.

Trigger input pulse is also provided as an input to a sensed capacitance pulse generator 154. Sensed capacitance pulse generator 154 is coupled in series to a resistor 160 and a capacitance coupling 136 between a pair of conductive metal plates comprising inner cylinder 86 and outer cylinder 88. The capacitive coupling 136 varies as the proximity or distance between inner cylinder 86 and outer cylinder 88 varies. In response to trigger input pulse 150, sensed capacitance pulse generator 154 generates a sensed pulse associated with the proximity of inner cylinder 86 and outer cylinder 88 over line 168.

In the preferred embodiment of the present invention, reference pulse generator 152 and sensed capacitance pulse generator 154 are both one shot integrated circuits (e.g., operational amplifier). In operation, one shot circuits 152 and 154 hold nodes 172 and 174, respectively, at ground level while waiting for trigger pulse 150. During this time, the voltage across capacitor 162 and capacitance coupling 136 between inner cylinder 86 and outer cylinder 88 is at zero. When one shot circuits 152 and 154 receive trigger pulse 150, the output pulses over lines 166 and 168, respectively, rise and the ground connection is released. This allows charging of capacitor 162 and capacitance coupling 136 between inner cylinder 86 and outer cylinder 88 through respective resistors 160 and 164. When one shot circuits 152 and 154 sense that the respective capacitor 162 and capacitance coupling 136 between inner cylinder 86 and outer cylinder 88 have been charged to a pre-set threshold, the output pulses over lines 166 and 168 fall and the nodes 170 and 172 are grounded again. In this manner, each of one shot circuits 152 and 154 outputs a pulse which is roughly the resistance times the capacitance of the two external components. The capacitive coupling of inner cylinder 86 and outer cylinder 88 decreases as the distance between them increases.

The reference pulse over line 166 and the sensed pulse indicating the proximity between inner cylinder 86 and outer cylinder 88 over line 168 are then fed into a comparator 156. Comparator 156 compares the widths of the reference pulse and the pulse indicating the proximity of inner and outer cylinders 86 and 84. Comparator 156 then generates an output 158 indicating whether the width of the sensed pulse indicating the proximity between inner and outer cylinders 86 and 84 exceeds the reference pulse width. When the proximity between inner and outer cylinders 86 exceeds the reference pulse width, sensor circuitry 134 cuts off power to the rest of laser level device 10. In the preferred embodiment of the present invention, comparator 156 is implemented using a D flip-flop. It should be appreciated that even though sensor circuitry 134 detects the proximity of the cylinders 84 and 86, it can also be utilized to detect the proximity between any pair of metal conductors.

The self-leveling compensator comprising a polygonal body having at least four point suspension thus provides a true horizontal plane as well as a vertical plane. Accordingly, expensive supplementary kits are not required to generate a plumb vertical plane. Further, separating the beam generator from the compensator combined with the polygonal body allows a projected vertical plane to be less sensitive on the position of the compensator pendulum in the lateral direction. In addition, dampening springs in accordance with the present invention provide protection against shocks.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A laser level device comprising:
   a reference surface;
   a laser beam generator mounted to said reference surface;
   a compensator supported proximate to said reference surface, said compensator including a pendulum having a polygonal body with at least a four point suspension, an optical device mounted to said polygonal body in the path of a laser beam produced by said laser beam generator to redirect said laser beam in a perpendicular direction and to further redirect said laser beam for compensating for any tilting of said laser level device, and a keeper mounted to said reference surface and at least partially surrounding said polygonal body such that an air gap is provided between said polygonal body and said keeper for affording rotational and lateral damping;
   a lens mounted to said reference surface between said laser beam generator and said optical device of said compensator for collimating said laser beam; and
   a beam sweeper supported above said reference surface in the path of said redirected laser beam from said optical device to sweep the redirected laser beam in a plane.

2. A laser level device as recited in claim 1 wherein said body and said keeper are essentially right rectangular prisms.

3. A laser level device as recited in claim 1 wherein said pendulum has a four point suspension comprising four suspension wires for suspending said body.

4. A laser level device as recited in claim 3 wherein said body includes a hollow, rectangular cylinder portion and an end portion to support said optical device.

5. A laser level device as recited in claim 4 wherein said keeper includes a hollow, rectangular cylinder portion.

6. A laser level device as recited in claim 3 wherein said four suspension includes two pairs of two crossed suspension wires.

7. A laser level device as recited in claim 6 further comprising a pair of spreaders to fix the point of crossing of said two crossed suspension wires for each of said two pairs of two crossed suspension wires.

8. A laser level device as recited in claim 3, wherein said four suspension wires comprise two pairs of two suspension wires, wherein each pair is attached to a support at a first end and to said body at a second end, and where, for each pair, the distance between said two suspension wires at their points of attachment to said body is twice the distance as compared to the distance between said two suspension wires at their points of attachment to said support.

9. A laser level device as recited in claim 8 further comprising a base, and a dampening spring coupling said base to said reference surface.

10. A laser level device as recited in claim 1 wherein both said body and said keeper comprise a conductive material.

11. A laser level device as recited in claim 10 further comprising a capacitive sensing apparatus coupled to both said body and said keeper.

12. A laser level device as recited in claim 1 wherein said optical device is mounted on said polygonal body at 45 degrees to redirect said laser beam in a truly leveled direction.

13. A laser level device as recited in claim 1 wherein said beam sweeper includes a pentaprism for redirecting said laser beam in a perpendicular direction.

14. A laser level device as recited in claim 12 wherein said optical device is a mirror.

15. A laser level device as recited in claim 11 wherein said capacitive sensing apparatus further comprises:
    a reference pulse generator providing a reference pulse in response to a trigger input;
    a sensed capacitance pulse generator providing a sensed capacitance pulse in response to said trigger input; and
    a comparator comparing said reference pulse and said sensed capacitance pulse and providing an output indicative of a capacitance sensed by said sensed capacitance pulse generator exceeding a value determined by said reference pulse generator.

16. A method for providing a laser level plane comprising;
    generating a laser beam;
    redirecting said laser beam for compensating for any tilting of said laser level device with a compensator including a pendulum having a polygonal body with at least a four point suspension and an optical device mounted on said polygonal body for redirecting said laser beam in a perpendicular direction;
    collimating said laser beam with a lens positioned between a source of said laser beam and said compensator;
    providing rotational and lateral damping by placement of a keeper at least partially about said polygonal body with an air gap therebetween; and
    rotating an optical rotator in the path of said laser beam redirected by said optical device of said compensator to provide a laser beam plane.

17. A method as recited in claim 16, wherein said body is essentially right rectangular prisms and is suspended at said at least a four point suspension.

18. A method as recited in claim 16, wherein said pendulum has a four point suspension comprising four suspension wires for suspending said body.

19. A method as recited in claim 16, wherein said body includes a hollow, rectangular cylinder portion and an end portion to redirect said laser beam in a truly leveled direction.

20. A method as recited in claim 18, wherein said four suspension wires are crossed pairwise to form two pairs of two crossed suspension wires.

21. A method as recited in claim 20, wherein the stiffness of said two crossed suspension wires are adjusted by varying the point of crossing of for each of said two pairs of two crossed suspension wires.

22. A method as recited in claim 18, wherein said four suspension wires comprise two pairs of two suspension wires, wherein each pair is attached to a support at a first end and to said body at a second end, and where, for each pair, the distance between said two suspension wires at their points of attachment to said body is twice the distance as compared to the distance between said two suspension wires at their points of attachment to said support.

23. A method as recited in claim 16 further comprising:
    sensing when said body moves more than a predetermined distance; and
    stopping said generation of laser beam and the rotation of said optical rotator upon sensing when said body moves more than said predetermined distance.

24. A method as recited in claim 16, wherein said laser beam is redirected into a truly leveled direction.

25. A method as recited in claim 16 wherein said laser beam is redirected in a true vertical direction.

26. A method as recited in claim 16 wherein said laser beam is redirected from a substantially horizontal direction into a true vertical direction.

27. A method as recited in claim 16 wherein said laser beam is redirected by reflecting off of a mirror.

28. A laser level device comprising:

a laser beam generator;

a compensator including a pendulum having a polygonal body with a suspension, an optical device mounted to said polygonal body in the path of a laser beam produced by said laser beam generator to redirect said laser beam for compensating for any tilting of said laser level device, and a keeper mounted to said reference surface and at least partially surrounding said polygonal body such that an air gap is provided between said polygonal body and said keeper;

wherein said suspension includes two pairs of two crossed suspension wires; and wherein each pair is attached to a support at a first end and to said body at a second end, and where, for each pair, the distance between said two suspension wires at their points of attachment to said body is substantially twice the distance as compared to the distance between said two suspension wires at their points of attachment to said support.

29. A laser level device as recited in claim 28 further comprising a pair of spreaders to fix the point of crossing of said two crossed suspension wires for each of said two pairs of two crossed suspension wires.

30. A laser level device as recited in claim 29 wherein said body and said keeper are essentially right rectangular prisms.

31. A laser level device as recited in claim 29 wherein said body includes a hollow, rectangular cylinder portion and an end portion to support said optical device.

32. A laser level device as recited in claim 29 further comprising:

sensing means for detecting when said body moves more than a predetermined distance; and stopping means for stopping said laser beam generator and said beam sweeper upon detection of said body moving more that said predetermined distance.

33. A laser level device with capacitive sensor comprising:

a laser beam generator;

a compensator including a pendulum having a body with a suspension, an optical device mounted to said body in the path of a laser beam produced by said laser beam generator for compensating for any tilting of said laser level device, and a keeper at least partially surrounding said body such that an air gap is provided between said body and said keeper;

a reference pulse generator providing a reference pulse in response to a trigger input;

a sensed capacitance pulse generator providing a sensed capacitance pulse in response to said trigger input, wherein said sensed capacitance pulse generator includes a variable capacitance that varies as a function of a proximity between said body and said keeper; and a comparator comparing said reference pulse and said sensed capacitance pulse and providing an output indicative of a capacitance sensed by said sensed capacitance pulse generator exceeding a value determined by said reference pulse generator, said comparator disabling said laser beam generator upon generation of said output.

34. A laser level device with capacitive sensor as recited in claim 33 wherein said reference pulse generator and sensed capacitance pulse generator are both one shot circuits.

35. A laser level device with capacitive sensor as recited in claim 34 wherein said comparator is a flip-flop.

36. A laser level device with capacitive sensor as recited in claim 33 wherein said reference pulse generator further comprises:

a first one shot circuit receiving said trigger input; and a reference capacitor and a variable resistor coupled in series to said first one shot circuit, wherein said first one shot circuit generates said reference pulse having a reference width.

37. A laser level device with capacitive sensor as recited in claim 33 wherein said sensed capacitance pulse generator further comprises:

a second one shot circuit receiving said trigger input; and a resistor and a variable capacitance coupled in series to said second one shot circuit, wherein said second one shot circuit generates said sensed capacitance pulse having a pulse width.

38. A laser level device with capacitive sensor as recited in claim 33 wherein said sensed capacitance pulse generator generates said sensed capacitance pulse between a pair of metal conductors.

39. A laser level device with capacitive sensor as recited in claim 33 wherein said sensed capacitance pulse generator generates said sensed capacitance pulse between a pair of metal plates.

40. A laser level device with capacitive sensor as recited in claim 33 further comprising a switch for disabling said capacitive sensor based on an orientation of said laser level device.

41. A laser level device with capacitive sensor as recited in claim 40 wherein said switch includes a mercury switch.

* * * * *